Aug. 17, 1943.   H. J. MURPHY   2,327,328
SNAP FASTENER FOR TRIMMING AND LIKE STRIPS
Filed Dec. 9, 1941
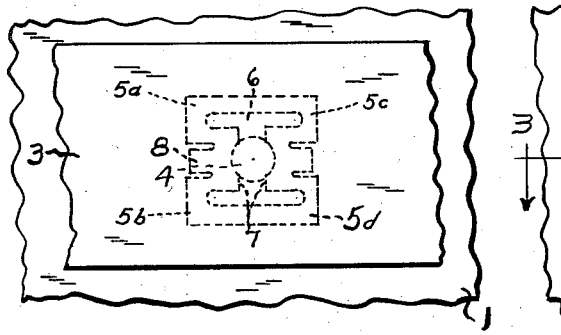
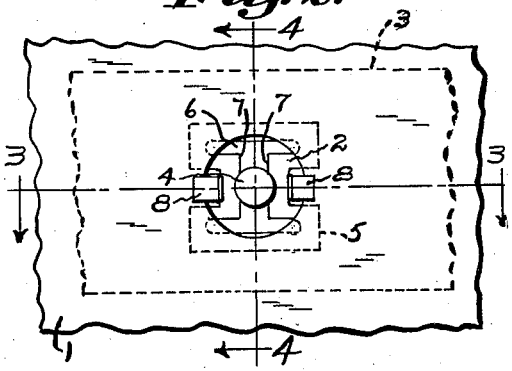
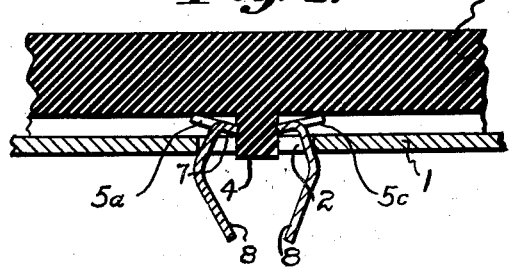
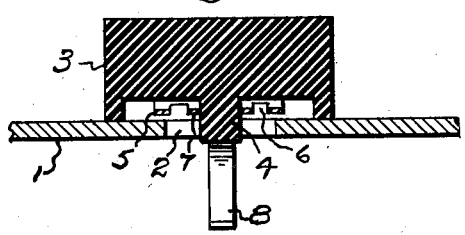
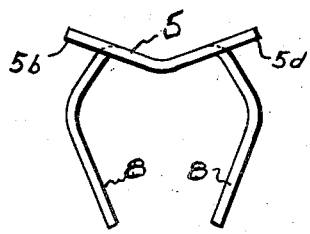
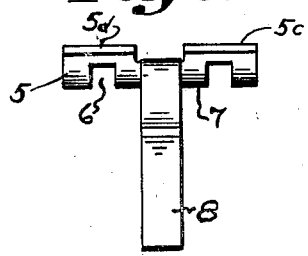
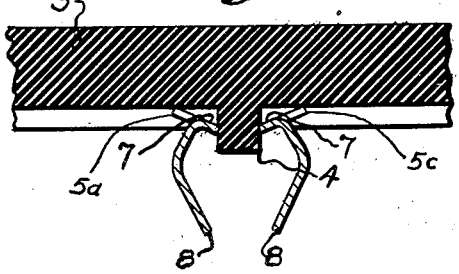
Inventor:
Howard J. Murphy.
by John Todd Att'y.

Patented Aug. 17, 1943

2,327,328

UNITED STATES PATENT OFFICE 2,327,328

SNAP FASTENER FOR TRIMMING AND LIKE STRIPS

Howard J. Murphy, Greenwood, Mass., assignor to United-Carr Fastener Corporation, Cambridge, Mass., a corporation of Massachusetts Application December 9, 1941, Serial No. 422,254

3 Claims. (Cl. 24—73)

My invention aims to provide improvements in snap fastener members particularly adapted for use in securing a trim piece, such as a molded strip, to a support which may be in the form of a metal panel.

In the drawing, which illustrates a preferred embodiment of my invention:

Fig. 1 is a plan view of a portion of a trimming installation showing one of my improved fastener members in dotted lines;

Fig. 2 is a bottom plan view of the same portion of the installation shown in Fig. 1;

Fig. 3 is a section taken on the line 3—3 of Fig. 2;

Fig. 4 is a section taken on the line 4—4 of Fig. 2;

Fig. 5 is a side elevational view of my improved fastener member per se;

Fig. 6 is an edge view of the fastener member shown in Fig. 5; and

Fig. 7 is a section through the trim strip and fastener shown in Fig. 3 before it is attached to a supporting panel.

While my improved fastener is used with a combination of elements which by this time is well known, viz., a trim strip installation, nevertheless I believe my fastener is of much simpler and less expensive construction than any fastener heretofore known for use in a similar installation.

The installation illustrated includes a thin sheet metal supporting panel 1 having a stud-receiving aperture 2, a trim strip, or other similar member, 3 preferably formed from plastic material and having a projection 4 on the under side thereof and my improved snap fastener formed from a single piece of sheet metal. The snap fastener holds the two parts together as clearly illustrated in Fig. 3.

The snap fastener selected for illustration is preferably formed from a springy material such as carbon steel heat-treated and has an H-shaped base 5 (Figs. 1 and 2) with an H-shaped aperture 6. This base is preferably bowed longitudinally and a pair of gripping fingers 7 intersect the H-shaped aperture at the center so that they may grip the projection 4 on the part 3, as illustrated in Figs. 2 and 3. Due to the shape of the base 5 and the aperture 6, these gripping fingers may move to permit passage of the projection 4, which is preferably of slightly larger diameter than the space between the opposed edges of the gripping fingers 7—7. The fastener also includes a pair of yieldable leg portions 8—8 which extend downwardly from the base and are preferably continuations of the gripping fingers 7—7, as clearly shown in Fig. 3. The legs 8—8 are bowed longitudinally so that they may cooperate to provide a snap fastener stud means which when entered into the aperture 2 will compress and expand to grip the supporting panel 1, as clearly illustrated.

In assembling the parts of the installation I prefer first to attach the fastener to the strip 3 and this accomplished by moving the base of the fastener over the projection 4 from the under side of the strip 3. As pressure is applied the projection 4 enters between the opposed edges of the gripping fingers 7—7 and they are forced downwardly and apart so that they may slide over the projection until the fingers 5ª, 5ᵇ, 5ᶜ and 5ᵈ of the H-shaped base contact the under surface of the part 3 at which time there is a tendency to flatten the bow-shaped base as pressure is continued. This flattening, together with the natural tendency of the gripping fingers 7—7 to grip into the plastic material, causes the edges of the gripping fingers 7—7 to bit into the material, as clearly shown in Figs. 3 and 7. Thereafter the part 3 with the fastener attached may be put in position relative to the supporting panel 1 and the legs 8—8 of the fastener may be forced through an aperture 2 by pressing upon the outer surface of the part 3. This causes the legs to pass through the aperture 2 in the part 1 and as they do they are moved toward each other until they pass the high points provided by the bowed legs when they again move away from each other due to their natural tendency to yield and expand. The legs then grip the material of the part 1 adjacent the aperture 2 and are held under compression, as will be seen by a comparison of Figs. 7 and 3. Since the legs are held under some compression when the installation is complete they also bring some pressure to bear upon the gripping fingers 7—7 and cause them to bite all the harder into the material of the projection 4. Thus the fastener holds the parts tightly together against any accidental separation, although it is possible to pry the member 3, together with the fastener attached, loose from the supporting panel 1.

While I have illustrated and described a preferred embodiment of my invention I do not wish to be limited thereby, as the scope of my invention is best defined by the following claims.

I claim:

1. A fastener member of the class described formed from a single piece of sheet metal and having a normally bowed apertured base having six yieldable fingers two of which are presented at the aperture to engage a part to be entered through said aperture and yieldable legs extending from said base and cooperating to provide a snap fastener means.

2. A fastener member of the class described formed from a single piece of sheet metal and having an H-shaped base with an H-shaped aperture, said base having six yieldable fingers two of which are presented at the H-shaped aperture to engage a part to be entered through said aperture and yieldable legs extending from said base and cooperating to provide a snap fastener means, and said base being normally bowed to provide for movement of all of the yieldable fingers thereof as and for the purposes described.

3. A snap fastener member formed from a single piece of sheet metal and having a bowed yieldable base provided with an aperture to receive a projection on a part to be fastened, a pair of gripping fingers formed in said base and extending in the same direction as the bow of the base and being located at opposite sides of said aperture and a pair of bowed legs connected to said fingers and extending outwardly from said base to provide for snap fastening engagement with another part to be fastened.

HOWARD J. MURPHY.